US009141813B2

(12) United States Patent
Cachin et al.

(10) Patent No.: US 9,141,813 B2
(45) Date of Patent: Sep. 22, 2015

(54) ORDERED DELETION OF CONTENT IN STORAGE SYSTEMS

(71) Applicant: International Business Machines Corporation, Armonk, NY (US)

(72) Inventors: Christian Cachin, Rueschlikon (CH); Robert Haas, Rueschlikon (CH); Anil Kurmus, Rueschlikon (CH); Alessandro Sorniotti, Rueschlikon (CH)

(73) Assignee: International Business Machines Corporation, Armonk, NY (US)

( * ) Notice: Subject to any disclaimer, the term of this patent is extended or adjusted under 35 U.S.C. 154(b) by 169 days.

(21) Appl. No.: 13/912,418

(22) Filed: Jun. 7, 2013

(65) Prior Publication Data

US 2014/0006802 A1    Jan. 2, 2014

(30) Foreign Application Priority Data

Jun. 28, 2012  (GB) .................................. 1211472.4

(51) Int. Cl.
*G06F 21/00* (2013.01)
*G06F 21/60* (2013.01)
*H04L 9/08* (2006.01)

(52) U.S. Cl.
CPC ............ *G06F 21/602* (2013.01); *H04L 9/0861* (2013.01)

(58) Field of Classification Search
CPC ....... G06F 21/60; G06F 21/00; G06F 21/602; H04L 9/00; H04L 9/08; H04L 9/0861
USPC ........................................................ 713/189
See application file for complete search history.

(56) References Cited

U.S. PATENT DOCUMENTS

| | | | |
|---|---|---|---|
| 7,783,615 B1 * | 8/2010 | Compton et al. .............. 707/694 |
| 2002/0087501 A1 * | 7/2002 | Breitbart et al. ................... 707/1 |
| 2005/0182951 A1 * | 8/2005 | Sohn ............................... 713/189 |
| 2006/0208903 A1 * | 9/2006 | Loh et al. ..................... 340/572.8 |
| 2006/0271599 A1 * | 11/2006 | Yamamoto et al. ............ 707/201 |
| 2007/0226809 A1 * | 9/2007 | Ellard ............................... 726/30 |
| 2008/0183656 A1 * | 7/2008 | Perng et al. ........................ 707/2 |
| 2010/0070772 A1 * | 3/2010 | Nakamura et al. ............. 713/176 |
| 2010/0332583 A1 * | 12/2010 | Szabo ........................... 709/202 |
| 2012/0039463 A1 * | 2/2012 | Gentry et al. .................... 380/28 |
| 2012/0079289 A1 * | 3/2012 | Weng et al. .................... 713/193 |

(Continued)

OTHER PUBLICATIONS

CNET, [online], [retrieved on Jun. 4, 2013]; retrieved from the Internet http://news.cnet.com/Credit-card-breach-exposes-40-million-accounts/2100-1029_3-5751886.html Joris Evers, "Credit card breach exposes 40 million accounts," Jun. 2005, pp. 1-6.

(Continued)

*Primary Examiner* — Michael Pyzocha
(74) *Attorney, Agent, or Firm* — Cantor Colburn LLP

(57) ABSTRACT

A computer-implemented method for storing an object includes providing an object, an ordering vector of the object, the ordering vector being associated to a lexicographic order having at least one dimension, and base keys associated to each dimension of the lexicographic order; deriving a key by retrieving the base key associated to the first dimension of the lexicographic order for which the ordering vector has a value different from the smallest value, and applying a one-way function a number of times corresponding to the value of the ordering vector for the last dimension of the lexicographic order; encrypting the object with the key; and storing the object as encrypted.

15 Claims, 2 Drawing Sheets

(56) References Cited

U.S. PATENT DOCUMENTS

2014/0006802 A1* 1/2014 Cachin et al. ............. 713/189
2014/0359309 A1* 12/2014 Cachin et al. ............. 713/189

OTHER PUBLICATIONS

USATODAY, [online], [retrieved on Jun. 4, 2013]; retrieved from the Internet http://usatoday30.usatoday.com/tech/products/2008-03-17-1667273433_x.htm David Sharp, "Breach exposes 4.2 M credit, debit cards," Mar. 17, 2008, pp. 1-2.
Dan Boner, et al.,"A Revocable Backup System," Proceedings of the Sixth USENIX UNIX Security Symposium, CA, Jul. 1996, pp. 1-7.
Computerworld, [online], [retrieved on Jun. 4, 2013]; retrieved from the Internet http://www.computerworld.com/s/article/9072198/Programmer_who_stole_drive_containing_1_million_bank_records_gets_42_months Jaikunriar Vijayan, "Programmer who stole drive containing 1 million bank records gets 42 months," Mar. 26, 2008, pp. 1-4.
Bauer and N. B. Priyantha, "Secure data deletion for linux file systems," in Proceedings of the 10th conference on USENIX Security Symposium—vol. 10, SSY 01, pp. 1-13, Berkeley, CA, USA, 2001, USENLX.
Giovanni Di Crescenzo, et al., "How to Forget a Secret (Extended Abstract)," STACS'99, LNCS, 1563, pp. 500-509, 1999.
R. Geambasu, T. Kohno, A. A. Levy, and H. M. Levy, "Vanish: increasing data privacy with self-destructing data," in proceedings of the 18th conference on USENIX security symposium, SSY 09, pp. 1-52, Berkeley, CA, USA, 2009, USENIX Association.
P. Gutmann, "Secure deletion of data from magnetic and solid-state memory," in Proceedings of the 6th USENIX Security Symposium, pp. 1-18, 1996.
N. Joukov, H. Papaxenopoulos, and E. Zadok, "Secure deletion myths, issues, and solutions," in Proceedings of the second ACM workshop on Storage security and survivability, StorageSS •06, pp. 1-6, New York, NY, USA, 2006, ACM.
N. Joukov and E. Zadok, "Adding secure deletion to your favorite file system," in Proceedings of the Third IEEE International Security in Storage Workshop, pp. 1-8, Washington, DC, USA, 2005, IEEE Computer Society.
Perlman, "The ephemerizer: making data disappear," Technical report, Sun Microsystems, Inc., Mountain View, CA, USA, 2005, pp. 1-20.
R. Perlman, "File system design with assured delete," in proceedings of the Third IEEE International Security in Storage Workshop, pp. 1-10, Washington, DC, USA, 2005, IEEE Computer Society.
Z. N. J. Peterson, R. Burns, J. Herring, A. Stubblefield, and A. D. Rubin, "Secure deletion for a versioning file system," in proceedings of the 4th conference on USENIX Conference on File and Storage Technologies—vol. 4, pp. 1-12, Berkeley, CA, USA, 2005, USENIX Association.
A. Shamir, "How to share a secret," Commun. ACM, 22, pp. 1-2, Nov. 1979.
Wei, "Reliably erasing data from flash-based solid state drives," in Proceedings of the 20th USENIX Security Symposium, 2011, pp. 1-13.
Wolchok, Hofmann, Heninger, Felten, Halderman, Rossbach, Waters, and Witchel, "Defeating Vanish with low-cost Sybil attacks against large DHTs," in proc. 17th Network and Distributed System Security Symposium (NDSS), ISOC, Feb. 2010, pp. 1-15.

* cited by examiner

ORDERED DELETION OF CONTENT IN STORAGE SYSTEMS

PRIORITY

This application claims priority to Great Britain Patent Application No. 1211472.4, filed Jun. 28, 2012, and all the benefits accruing therefrom under 35 U.S.C. §119, the contents of which in its entirety are herein incorporated by reference.

BACKGROUND

The invention relates to the field of computer science, and more specifically, to a computerized system, a method, a program and a data storage medium for storing objects encrypted based on a key and providing for the deletion of the objects.

Secure data deletion often features as a requirement in a number of domains. As an example, privacy and data protection regulations of different countries have agreed on a set of common principles. Among those, "purpose" and "security" are particularly relevant, as it appears from Directive 95/46/EC of the European Parliament and of the Council of 24 Oct. 1995 on the protection of individuals with regard to the processing of personal data and on the free movement of such data, and from the OECD guidelines on the protection of privacy and transborder flows of personal data. The principle of "purpose" states that personal data can be stored only for purposes agreed by the data owner, and that once this purpose is no longer valid, data should be erased. Coupled with the security principle, that mandates that data should be kept secure from any potential abuses, it is clear that the legislator requires special care in the handling of "expired" data. Indeed, access to data whose purpose is expired would clearly represent a violation of both principles.

This is even truer when the information at hand belongs to particularly sensitive domains such as healthcare and finance. In this case, the numerous existing regulations require avoiding any unauthorized exposure of confidential corporate and government data by imposing fines and even civil and criminal liability. This is the case for example for the Health insurance portability and accountability act in 1996, the Financial services modernization act in 1999, the Public company accounting reform and investor protection act in 2002, and the Fair and accurate credit transactions act in 2003, of the US Congress.

Retaining data too long increases the risks of unwanted disclosure, for instance through a security breach or by subpoena. The truth of this statement is backed up by the number of incidents whereby companies have lost sensitive data. Such incidents are related in different news articles and studies, such as the ones by J. Vijayan entitled "Programmer who stole drive containing 1 million bank records gets 42 months", Computer World, 2008, or by D. Sharp, entitled "Breach exposes 4.2 million credit, debit cards", Associated Press, 2008, or by J. Evers, entitled "Credit card breach exposes 40 million accounts", CNET News 2005. The 2010 annual study entitled "U.S. cost of a data breach" by Symantec Corporation in 2011 showed that the average cost of such a data breach is in the order of millions of dollars, and that this cost is rising over time.

These simple facts show how information that is no longer required can only become a liability for a company, and that an important goal of IT systems in the corporate world should be the ability of disposing of information in a secure way.

Standard OS deletion primitives do not offer a solution to the problem of secure deletion. Indeed, a deletion operation such as unlink( ) and remove( ) in Unix operating systems only remove the reference to a file from the filesystem data structure, leaving the actual data on the physical disk.

A first known approach towards secure file deletion is overwriting. However, if done naively, overwriting may still leave magnetic traces of past data in the disk. Gutmann et al. showed how secure deletion can be achieved by overwriting the content using certain patterns that are adapted to the low-level encoding mechanism of drives (P. Gutmaun, "Secure deletion of data from magnetic and solid-state memory", in Proceedings of the 6th USENIX Security Symposium, pages 77-89, 1996). However, a number of problems affect this solution. Firstly, large files cannot be deleted efficiently. Secondly, if files are replicated to increase their availability, or backed up, the burden of deletion increases linearly in the number of copies.

In addition, tools that achieve secure deletion through data overwriting (like wipe, eraser and shred developed for known operating systems) work only if the overwrite patterns apply to the actual physical device at hand, if the patterns are actually being written to disk (and not only to cache), and if the writes are targeted to the disk sectors that contained the data. Without detailed knowledge of the media at hand, ensuring the first condition is hard. The second condition can be ensured in a complicated way, through an OS-level or disk-level write barrier, write cache flush, or by disabling the write cache. With respect to the third condition, enforcing write locality is quite hard in modern file system. Indeed, journaling file systems, such as, for instance, JFS, ReiserFS, XFS, Ext3, perform write operations on journals and not directly to disk. Other filesystems write redundant data, others take disk snapshots or cache data in temporary locations. Furthermore, it has been shown by M. Wei, L. M. Grupp, F. M. Spada, and S. Swanson in their paper entitled "Reliably erasing data from flash-based solid state drives", in Proceedings of the 20th USENIX Security Symposium, 2011, that none of the available disk overwrite techniques are effective if data is stored on different media, such as solid-state drives. Generally, storage systems have many layers. The problem is that knowledge of lower-layer implementation mechanisms is lacking and the interfaces do not contain methods for instructing a lower layer to securely delete data.

A number of works have attempted to implement overwriting-based techniques as an automatic feature of existing filesystems. In the paper by Bauer and N. B. Priyantha entitled "Secure data deletion for linux file systems", in Proceedings of the 10th conference on USENIX Security Symposium—Volume 10, SSYM'Ol, pages 12-12, Berkeley, Calif., USA, 2001, USENLX Association, the authors present an implementation of an overwrite-based secure deletion extension for the ext2 filesystem. The system is based on a separate daemon carrying out an asynchronous overwrite of blocks that have been marked as deleted. This work has the shortcoming of only supporting an outdated, non-journaled filesystem. In the papers by N. Joukov, H. Papaxenopoulos, and E. Zadok entitled "Secure deletion myths, issues, and solutions", in Proceedings of the second ACM workshop on Storage security and survivability, StorageSS '06, pages 61-66, New York, N.Y., USA, 2006, ACM, and by N. Joukov and E. Zadok entitled "Adding secure deletion to your favorite file system", in Proceedings of the Third IEEE International Security in Storage Workshop, pages 63-70, Washington, D.C., USA, 2005, IEEE Computer Society, the authors present a solution for secure deletion based on intercepting deletion calls and translating them with link( )/unlink( ) operations that move files in a specified folder. Then, the shred utility is asynchronously used on these files. All these works share the shortcomings of overwrite-based approaches highlighted above.

In their paper entitled "A revocable backup system", in proceedings of the 6th conference on USENIX Security Symposium, Focusing on Applications of Cryptography—Volume 6, pages 9-9, Berkeley, Calif., USA, 1996, USENIX Association, D. Boneh and R. J. Lipton present an approach for deletion of content—in particular backed-up off-line content. The key idea the authors propose is to encrypt all the content that may require secure deletion, and—upon secure deletion request—carry out a deletion of the keys instead of the deletion of the file content. The authors also introduce the support for versioned backups. However, using such a system translates to the requirement of managing a number of cryptographic keys for each individual file.

The idea of leveraging on cryptography to achieve secure deletion has been picked up by a number of subsequent works. In the paper by Z. N. J. Peterson, R. Burns, J. Herring, A. Stubblefield, and A. D. Rubin entitled "Secure deletion for a versioning file system", in proceedings of the 4th conference on USENIX Conference on File and Storage Technologies—Volume 4, pages 11-11, Berkeley, Calif., USA, 2005, USENIX Association, the authors present a solution to support secure deletion in a versioning filesystem, based on the idea of adding short, cryptographically computed tags to a file: the deletion of the tag implies the impossibility to recover the file. However, differently from keys, tags are public and can be stored and replicated as normal data.

In the paper entitled "The ephemerizer: making data disappear", Technical report, Sun Microsystems, Inc., Mountain View, Calif., USA, 2005, Perlman presents the concept of the ephemerizer: a semi-trusted third party that creates and advertises public keys, and guarantees their secure deletion after a predefined amount of time. This way, users can encrypt the session keys used to encrypt messages for one another, using one of the keys of the ephemerizer, with the assurance that after their expiration time, these keys will no longer be available. In the paper entitled "File system design with assured delete", in proceedings of the Third IEEE International Security in Storage Workshop, pages 83-88, Washington, D.C., USA, 2005, IEEE Computer Society, the same author presents a solution where such idea can be used to implement a filesystem. This work, however, pays the penalty of being built on a solution initially designed for encryption of messages between different users.

In the paper by R. Geambasu, T. Kohno, A. A. Levy, and H. M. Levy. entitled "Vanish: increasing data privacy with self-destructing data", in proceedings of the 18th conference on USENIX security symposium, SSYM'09, pages 299-316, Berkeley, Calif., USA, 2009, USENIX Association, the authors show how the churn rate of DHT-based peer-to-peer systems can be used to achieve secure deletion. Their solution requires content to be encrypted using a cryptographic key, and such key needs to be split in shares using for instance Shamir's approach exposed in the paper by A. Shamir entitled "How to share a secret", Commun. ACM, 22:612-613, November 1979. Then, the different shares of the key can be distributed to random users of a DHT. Since users will naturally disappear from the DHT, and given that keys are only stored in non-persistent memory, after a certain amount of time the key will no longer be available. However the scheme can be attacked by exploiting well-known sybil attacks on DHTs, as explained in the paper by Wolchok, Hofmann, Heninger, Felten, Halderman, Rossbach, Waters, and Witchel entitled "Defeating Vanish with low-cost Sybil attacks against large DHTh", in proc. 17th Network and Distributed System Security Symposium (NDSS), ISOC, February 2010.

An approach, referred to as Di Crescenzo et al.'s approach that constitutes an approach for an abstraction of the secure deletion problem, is now presented. This approach is also described in the paper by Di Crescenzo, N. Ferguson, R. Impagliazzo, and M. Jakobsson entitled "How to forget a secret", in proceedings of the 16th annual conference on Theoretical aspects of computer science, STACS'99, pages 500-509, Berlin, Heidelberg, 1999, Springer-Verlag. The method comprises building an erasable memory of arbitrary size from an external erasable memory of small, constant size and standard (non-erasable) memory of arbitrary size. The idea is centered around a key tree: each node of the tree is associated to a cryptographic key. No key is stored in plaintext in the tree, but it is stored after having been encrypted with the key associated to its parent node (encrypting a key being also called key-wrapping). The key associated to the root is stored in the external erasable memory, whereas the other values are stored in the standard memory. The key tree is a complete n-ary tree and the $N=n^m$ values that require secure deletion are arranged as leaves of this tree: the leaves are therefore the only nodes whose values are actual data and not cryptographic keys. The data associated to the leaves is encrypted using the key of each node's parent node. When a value requires secure deletion, the following operations are executed over the tree: for each node in the path between the node requiring deletion and the root, 1) a new value is drawn from the keyspace and is wrapped using the new unwrapped value of its ancestor; and 2) the value of each of its siblings is re-wrapped using the new unwrapped value of the ancestor. The same happens for the key associated to the root of the tree. In addition, since such key is stored on a securely erasable memory, its retrieval after the deletion operation is impossible. The node requiring secure deletion is not reencrypted. This way, its secure deletion is guaranteed since its decryption would require—thanks to the property of the tree—access to the old value of the root, which is no longer possible by definition, as it is stored in the erasable memory.

Thus, there is still a need for an improved method for storing data and providing for their later secure deletion.

SUMMARY

In one embodiment, a computer-implemented method for storing an object includes providing an object, an ordering vector of the object, the ordering vector being associated to a lexicographic order having at least one dimension, and base keys associated to each dimension of the lexicographic order; deriving a key by retrieving the base key associated to the first dimension of the lexicographic order for which the ordering vector has a value different from the smallest value, and applying a one-way function a number of times corresponding to the value of the ordering vector for the last dimension of the lexicographic order; encrypting the object with the key; and storing the object as encrypted.

In another embodiment, a computer readable storage medium having computer readable instructions stored thereon that, when executed by a computer, implement a method of storing an object. The method includes providing an object, an ordering vector of the object, the ordering vector being associated to a lexicographic order having at least one dimension, and base keys associated to each dimension of the lexicographic order; deriving a key by retrieving the base key associated to the first dimension of the lexicographic order for which the ordering vector has a value different from the smallest value, and applying a one-way function a number of times corresponding to the value of the ordering vector for the last dimension of the lexicographic order; encrypting the object with the key; and storing the object as encrypted.

In another embodiment a system includes a key management server including a processor and a memory, the key management server configured to: provide an object, an ordering vector of the object, the ordering vector being associated to a lexicographic order having at least one dimension, and base keys associated to each dimension of the lexicographic order; derive a key by retrieving the base key associated to the first dimension of the lexicographic order for which the ordering vector has a value different from the smallest value, and applying a one-way function a number of times corresponding to the value of the ordering vector for the last dimension of the lexicographic order; encrypt the object with the key; and store the object as encrypted.

BRIEF DESCRIPTION OF THE SEVERAL VIEWS OF THE DRAWINGS

A system and a process embodying the invention will now be described, by way of non-limiting example, and in reference to the accompanying drawings, where.

DETAILED DESCRIPTION

Figure 1:
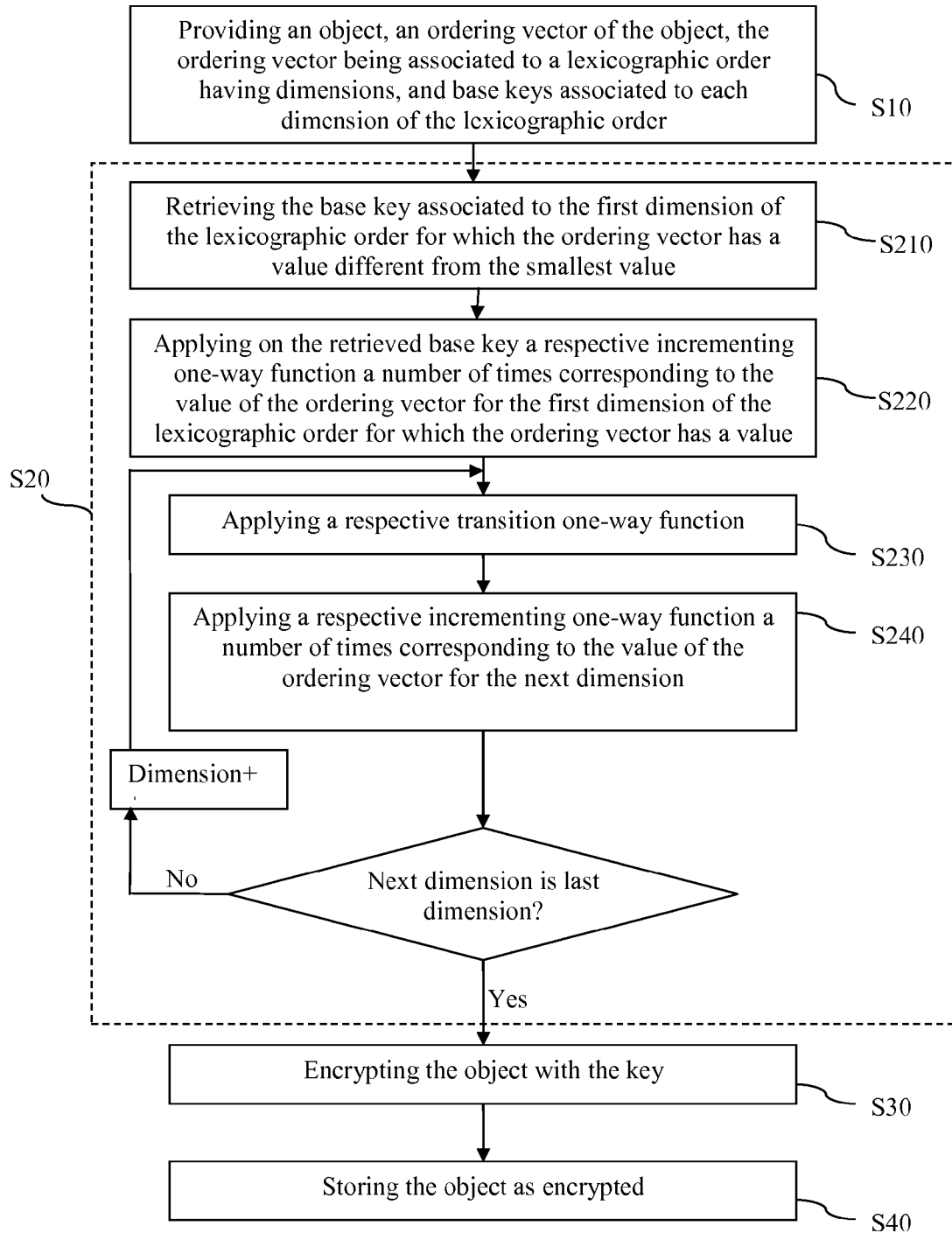
FIG. 1 shows a flowchart of an example of a method for storing an object.

A computer-implemented method is provided for storing an object. The method comprises providing an object, an ordering vector of the object, the ordering vector being associated to a lexicographic order having at least one dimension, and base keys associated to each dimension of the lexicographic order. The method also comprises deriving a key by firstly retrieving the base key associated to the first dimension of the lexicographic order for which the ordering vector has a value different from the smallest value, and, lastly applying a one-way function a number of times corresponding to the value of the ordering vector for the last dimension of the lexicographic order. The method then comprises encrypting the object with the key, and storing the object as encrypted. Such a method improves the storing of an object that has to be deleted according to an order, by providing an improved secure deletion of the object.

A method is also provided for constructing a database of objects by iterating the method for storing an object, thereby storing a plurality of objects. Here, the term "database" only refers to a plurality of stored objects.

A method is also provided for deleting objects from an obtainable database according to the above. The method for deleting is performed after the method for constructing the database, or is performed independently on a database having previously been obtained according to the method for constructing the database and provided as such. The way to perform the deletion will be described later, referring to examples of the method for storing an object. In general, the method for deleting objects deletes the objects of lowest order from the database by replacing the base key associated to the last dimension by the key derived for encrypting objects of next to lowest order. This method of deletion deletes objects according to their order, by deleting the objects of lowest order (i.e., the objects whose turn it is to be deleted), in a secure way. The method of deletion may thus be iterated, the objects of next to lowest order of an iteration becoming objects of lowest order of the next iteration.

As will be appreciated by one skilled in the art, aspects of the present invention may also be embodied as a computerized system comprising a key management server and adapted to perform the methods, as a method for using (thereby performing the methods) or configuring the system (thereby making it adapted for performing the methods without further software installation), or as a computer program product for performing the methods mentioned above.

By "computerized system", it is meant any type of system having computing capacities, for example a system having a hardware processor. For example, it is meant a desktop computer or a laptop computer. The computerized system comprises a storage system. The storage system consists of any means for storing data such as a hardware memory comprising non-volatile and/or volatile parts. The storage system of the contemplated computerized system actually stores (i.e., is adapted to store) objects in an encrypted form. The objects consist of a quantity of data forming a unity. For example, the objects are files (e.g., computer files) and/or directories. As known per se, the key management server comprises a processing unit and memory (possibly as a shared part of the CPU and memory of the system used for other purposes) and executes instructions recorded on the memory to perform the steps of the method pertaining to keys.

Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(a) (i.e., data storage medium(a)) having computer readable program code recorded thereon.

Any combination of one or more computer readable medium(a) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium, i.e., data storage medium, may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the likes and conventional procedural programming languages, such as the "C" programming language or similar programming languages. The program code may be executed entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A method for storing an object is now discussed.

The object may be any data or piece of data to be stored on a memory of a computerized system executing the method. The object is first provided unencrypted, but is to be stored encrypted thanks to the method. This way, the object may be securely deleted by simply deleting the key used for its encryption, thereby forbidding the decryption of the object as stored. The method thus offers the advantages of cryptographic storage. In other words, the objects are not stored as such on the computerized system but are encrypted, so as to be hidden, based on a respective key. In order to read (i.e., access to the contents of) an object, the key is necessary (as well as the encryption algorithm, which may of course also be stored, or known to the one trying to read the objects). It is thus possible to securely delete an object by deleting the key. Indeed, if the key is deleted, the object may no longer be decrypted. And the computerized system actually comprises a key management server configured for deleting a key. Keys are easier to delete than objects, and they are also easier to manage and to control.

In the method, it is referred to one key derived in a specific way to encrypt the object. The derivation of the method has a particular purpose linked to ordered deletion and explained later. This does not exclude the possibility of encrypting the object with other keys derived with other methods for other purposes from ordered deletion. Indeed, the object may be encrypted based on more than one key. However, only the specific key derived by the method is discussed in the following.

Also, the object may be stored encrypted based on an all-or-nothing transform, for example by having already been encrypted by its owner for a purpose independent to that of secure deletion (e.g., to protect its confidentiality). In other words, the object is previously encrypted, based on an all-or-nothing transform, i.e., an encryption algorithm under which data may be decrypted only if the whole encrypted data is retrievable. The computerized system may then provide for encrypting only a part of the object (already encrypted once) based on the key (in other words, a second encryption occurs, that second encryption only concerning a part of the object). This makes the encryption more efficient.

The object is provided with an ordering vector, or with information allowing the determination of the ordering vector and thus its provision to the system. The ordering vector is a vector (possibly of dimension 1, or of dimension higher than 1) that indicates the order of the object (in the deletion process), according to a given order relationship (ordering rules). In other words, the ordering vector is a rank, or a position in the ordering relationship, given to the object. For example, the ordering vector indicates an offset relative to the present state of the computerized system, representing the time of deletion of the object. Objects are then ordered according to this offset. With this respect, several objects may have the same ordering vector. The ordering vector indicates the order according to which the object has to be deleted. For example, as will be discussed later, the order may correspond to a retention period (i.e., an indication of the remaining period of time that a file has to be kept before being deleted from the computerized system). For example, the ordering vector may indicate a date of deletion of the object. In that case, the ordering relationship is the chronological order.

Indeed, a particular case for secure deletion is represented by retention sets. Retention sets are sets of data that have a very precise expiration date: each data item in the set should be accessible before the expiration date and irretrievable after. This scenario is very common in the real world: for example, as mentioned above, a number of laws and regulations specify retention periods, implying that data must be deleted after a fixed amount of time.

However, the method can apply to any type of attribute where an order can be established between any two values that the given attribute type may take.

Now, the ordering vector is associated to a lexicographic order (i.e., the ordering vector indicates the rank of the object according to the lexicographic order). The lexicographic order may correspond to an attribute of the object. The attribute may a value that belongs to a totally ordered set of values (a totally ordered set of value being an ordered set of value where any pair of values are ordered). The lexicographic order may be of dimension 1, thus leading to the particular case of an ordering vector per object of dimension 1 (i.e., a single value). More generally, the lexicographic order is of dimension higher than 1. It is thus possible to refer to each of the dimensions of the lexicographic order.

This means that two objects having a respective ordering vector are ordered one with respect to the other according to the values taken by the respective ordering vectors for each dimensions. Specifically, the dimensions of the lexicographic order are themselves ordered, the highest ranked dimension corresponding to the first coordinate of the ordering vectors, that is to say, the first dimension. And one object has a higher order than the other (i.e., the object having a higher order being to be deleted first) if, and only if, when comparing the values of the ordering vectors for each dimension starting from the highest ranked dimension, for the first dimension for which the values are different, the value of the ordering vector of the object of higher order is smaller.

The method further comprises providing base keys associated to each dimension of the lexicographic order. In other words, one base key per dimension is provided. The provision of the base key may simply consist in having them stored in the computerized system, managed by the key management server. The base keys are merely encrypting keys which are used to derive the key specific for encrypting the object.

The method also comprises deriving a key for encrypting the object and storing it as encrypted.

First, the deriving comprises retrieving (from a memory of the computerized system, e.g., with the key management server) one of the base keys. The base key retrieved is the base key associated to the first dimension of the lexicographic order for which the ordering vector has a value different from the smallest value (i.e., the dimension corresponding to that first coordinate of the ordering vector which is different from the smallest value, i.e., the value for the highest rank for that coordinate). The ordering vector takes values for each of the dimensions of the lexicographic order. For each dimension, there is a smallest value, corresponding to the highest rank according to the dimension. For example, if the lexicographic order provides vectors of the type $(x_1, \ldots, x_n)$, with $x_1, \ldots, x_n \in N$ (natural integers), the smallest value for each dimension is 0. For example, for a vector $(0, 0, \ldots, 0, x_i=3, x_{i+1}, \ldots, x_n)$, the first dimension of the lexicographic order for which the ordering vector has a value different from the smallest value is i, because $x_i$ is the first coordinate of the ordering vector different from 0. In the specific case where all coordinates are equal to the smallest value, the base key corresponding to the last dimension is retrieved.

Lastly, the deriving comprises applying a one-way function (i.e., a non invertible function, as known per se) a number of times corresponding (e.g., equal) to the value of the ordering vector for the last dimension of the lexicographic order. As it will be described below with examples, the one-way function is applied on a value dependent on the retrieved base key (possibly the base key or an intermediate key derived from the base key), and on values of the ordering vector for all dimensions between the first dimension of the lexicographic order for which the ordering vector has a value different from the smallest value and the last dimension of the lexicographic order.

As a consequence, the method improves the storing of an object that has to be deleted according to an order, by providing an improved secure deletion of the object, and by reducing the number of keys that need to be stored and managed by the key management server. This enhances computational efficiency of the computerized system and makes the deletion more secure by reducing the number of errors.

For example, let us consider two consecutive objects A and B (i.e., the objects have consecutive ordering vectors, such that B is to be deleted right after A. In other words, A and B are provided with ordering vectors such as, respectively $(x_1, \ldots, x_{n-1}, x_n)$ for A and $(x_1, \ldots, x_{n-1}, x_n+1)$ for B. The method may be executed for each object, such that A and B are stored based on their ordering vector. As a consequence, the keys $k_A$ and $k_B$ used for respectively encrypting and storing A and B differ only by the fact that the one-way function (let us call it $f$) has been applied once more in the case of B. In other words, $k_B = f(k_A)$.

Now, let us focus on the actions performed by the method for deleting the objects. Let us consider that all other objects that had to be deleted before A and B have been deleted, and it is now the turn of A to be deleted. At this point, the ordering vector of A may have been updated by the method for deleting. Thus, the ordering vector of A may be $(0, \ldots, 0)$, and the ordering vector of B is now $(0, \ldots, 1)$.

Parallel to that, the base keys stored for each dimension of the lexicographic order may have also been updated by the method for deleting. Examples of such updates will be provided later. In the present case, when it is the turn of A to be deleted, the updated version of the base key associated to the last dimension of the lexicographic order may be stored as $k_A$. As a consequence, should there be a need to do so before deletion, $k_A$ is used for decrypting A by simple retrieval of the base key associated to the last dimension, and for decrypting B, it is sufficient to apply $f$ once to $k_A$ and thereby obtain $k_B$. Thus, only one base key and one function need to be stored to decrypt both A and B, instead of managing several keys (of course, this is all the more advantageous in the case more objects are stored by the system).

For the deletion of A, the method for deleting replaces $k_A$ with $k_B$ by applying $f$, and subsequently deletes $k_A$. Given that $f$ is a one-way-function, this makes it impossible to retrieve $k_A$, and A is thus securely deleted because it may not be decrypted anymore. At the same time, B may still be decrypted, because $k_B$ is still stored by the system. Meanwhile, the ordering vector of B which was $(0, \ldots, 1)$ is updated to $(0, \ldots, 0)$ for the next iteration of the method of deleting.

Thus, the method is particularly advantageous.

Two options of the method are now discussed with reference to examples.

In the first option, the dimension of the lexicographic order is equal to 1. The ordering vector thus has a single value and a single base key is provided by the system. In this case, deriving the key for storing the object provided for storage consists of retrieving the single base key and applying to the single base key the one-way function a number of times corresponding to the single value of the ordering vector. This is discussed below with reference to a lexicographic order corresponding to a retention period.

This first option assumes time is partitioned in adjacent periods of a predefined fixed size. To identify time period the method uses a p-bit counter t. The method assumes the existence of a securely erasable memory, i.e., a memory whose content is effectively irretrievable after its deletion has been requested. This assumption is reasonable e.g., if the required size for this memory is small. Let m be the bit length of keys in the computerized system.

At the heart of the method lays a chaining construction that allows—from the state associated to a given time period—to efficiently compute the state of the immediately subsequent period (and by extension, of all the following ones). To perform the derivation of keys the method uses a pseudo-random number generator (PRNG) $f: \{0,1\}^m \to \{0,1\}^m$ for key derivation.

The method calls three algorithms:

Init( )

This algorithm generates an initial, random key $K_0$ for the initial period $t_0=0$ and stores the pair $(K_0,t_0)$ in the securely erasable memory.

DeriveKey($t_i$)→($K_i$)

This algorithm generates and returns the key $K_i$ associated to the time period $t_i$.

the pair $(K_j,t_j)$, corresponding to the current time period and its associated key, is fetched from the securely erasable memory;

the value $n \leftarrow t_i - t_j$ is computed; if n is negative, this algorithm reports an error and returns;

$K_i$ is computed by evaluating n times the function $f$ on input $K_j$ (e.g., for n equals two, $K_i = f(f(Kj))$ NextPeriod( )

This algorithm is invoked every time a time period is about to expire. The algorithm fetches $(K_j,t_j)$ from the securely erasable memory, creates a new pair $(f(K_j),t_j+1)$, writes it in the securely erasable memory and deletes the old pair.

The scheme can be used to achieve secure deletion of retention sets as follows: given a file, its expiration period is determined and the key K associated to that period is derived using the DeriveKey algorithm. The file is encrypted with a random File-Encrypting Key (FEK) and the FEK is in turn encrypted with a key derived applying a secure key derivation function on input K. At the expiration of each period, the algorithm NextPeriod is invoked.

This approach achieves several important objectives: at any point in time, the system is only required to manage a single key. As a consequence, the size of the securely erasable memory can be very small. Additionally, the securely erasable memory is the only persistent storage required by the system—as opposed to the solution in Di Crescenzo et al.'s approach, where a small securely erasable memory is coupled with a (possibly very) large standard memory.

An example of the second option, wherein the dimension of the lexicographic order is strictly higher than 1, is now discussed with reference to FIG. 1. The second option accelerates the method on the executions of the DeriveKey algorithm from a computational perspective. Indeed if the granularity of time periods is very small, the derivation of a key for a retention period that expires far away in the future may entail a very large number of evaluations of $f$.

In this example of the second option, the method comprises the providing (S10). Then, deriving (S20) the key comprises, after retrieving (S210) the base key applying (S220) on the retrieved base key a respective incrementing one-way function (respective to the dimension associated to the retrieved base key) a number of times corresponding (e.g., equal) to the value of the ordering vector for the first dimension of the lexicographic order for which the ordering vector has a value different from the smallest value (i.e., the dimension associated to the retrieved base key). Then, the deriving (S10) comprises repeating, from the first dimension of the lexicographic order for which the ordering vector has a value different from the smallest value until the last dimension of the lexicographic order, operations on the result of (obtained after the operations performed at) the previous step (of the repetition). The operations comprise first applying (S230) a respective transition one-way function (respective to the current dimension). The operations comprise then applying (S240) a respective incrementing one-way function (respective to the current dimension) a number of times corresponding to (e.g., equal to) the value of the ordering vector for the next dimension. The incrementing one-way functions and the transition one-way functions are merely one-way functions, the adjectives "incrementing" and "transition" designating the use of the functions.

The method may thus keep track of a counter corresponding to the current dimension. The counter is initialized at the first dimension of the lexicographic order for which the ordering vector has a value different from the smallest value when step (S210) is performed. The step (S220) is performed. Then, the loop starts with (S230) and (S240) being repeated, as long as the counter is strictly inferior to the one corresponding to the last dimension. Thus, the last iteration of (S240) corresponds to the step of lastly applying a one-way function a number of times corresponding to the value of the ordering vector for the last dimension of the lexicographic order.

The incrementing one-way functions may be the same. Alternatively or additionally, the transition one-way functions may be the same. This simplifies the data needed to be stored by the computerized system.

The dimensions of the lexicographic order are of a fixed cardinality or a variable cardinality. In other words, the dimensions of the lexicographic order may or may not have the same number of values. The variable allows more flexibility.

An example of the second option is now discussed.

This example introduces l levels (i.e., dimensions) and l sub-counters $t_{i;0}, \ldots, t_{i;l-1}$ that will be used—instead of the single counter $t_i$ of the example of the first option—to identify time periods (thereby creating a lexicographic order of strictly more than one dimension). In particular, $t_{i,0}$ is a p/l-bits counter corresponding to the bits of $t_i$ in the range $[0, p/l-1]$, $t_{i,1}$ in the range $[p/l; 2p/l-1]$ and so forth. Let $f: \{0; 1\}^* \to \{0; 1\}^m$ and $g: \to \{0; 1\}^* \to \{0; 1\}^m$ be two distinct pseudo-random number generators.

The rationale behind introducing levels is that a single key derivation using the function $f$ at any given level is equivalent to a leap of $2^{p/l}$ key derivations at the level immediately below. When—at a given level—the counter reaches the maximum value $(2^{p/l}-1)$, a derivation at the level above is required. The function $f$ is used to the same end as in the previous scheme; the function g instead is used to derive the key of a lower level from that of a higher one.

The method of the example executes the following algorithms:

Init(l)

This algorithm performs the initialization of the system. It receives as input the number l of levels we want to introduce. This algorithm creates an array A of l key-counter pairs that are kept in the securely erasable memory. Algorithm 1 below shows the details of the algorithm in pseudo-code.

---

Algorithm 1: Initialization algorithm

```
1: function Init(l)
2:    K ← {0, 1}^m
3:    for i ← 0 to l - 2 do
4:        A[i].key ← f(K)
5:        A[i].ctr ← 0
6:        K ← g(K)
7.   end for
8:    A[l - 1].key ← K
9:    A[l - 1].ctr ← 0
10: end function
```

---

DeriveKey($t_i$)→($K_i$)

This algorithm generates and returns the key $K_i$ associated to the time period $t_i$. At first, $t_i$ is broken down in its l sub-counters, $t_{i;0}, \ldots, t_{i;l-1}$ as explained above. Then, Algorithm 2 is executed. Notice that updates to the array A happen in the securely erasable memory; similarly, temporary values are stored in the securely erasable memory as well.

---

Algorithm 2: Key-derivation algorithm

---

```
1: function DeriveKey(t_{i,0}, ..., t_{i,l-1}) → (K_i)
2:   K ← ⊥
3:   for j ← 0 to l − 2 do
4:     if K = ⊥ then
5:       if t_{i,j} = A[j].ctr then
6:         continue
7:       else
8:         if t_{i,j} − A[j].ctr < 0 then
9:           return ERR
10:        end if
11:        K ← f^{t_{i,j}−A[j].ctr−1}(A[j].key)
12:      end if
13:    else
14:      K ← g(K)
15:      K ← f^{t_{i,j}}(K)
16:    end if
17:  end for
18:  if K = ⊥ then
19:    if t_{i,l−1} − A[l − 1].ctr < 0 then
20:      return ERR
21:    end if
22:    K ← f^{t_{i,l−1}−A[l−1].ctr}(A[l − 1].key)
23:  else
24:    K ← g(K)
25:    K ← f^{t_{i,l−1}}(K)
26:  end if
27:  return K
28: end function
```

---

NextPeriod( )

This algorithm is invoked every time a time period is about to expire. The algorithm fetches all counters A [i].ctr, concatenates them together to obtain t'; it then sets t=t'+1 (if the increment overflows, an error is returned). Then t is broken down in its l sub-counters, $t_{i,0}, \ldots, t_{i,l-1}$ as explained above. Then, Algorithm 3 is executed. Notice that updates to the array A happen in the securely erasable memory; similarly, temporary values are stored in the securely erasable memory as well.

---

Algorithm 3: Key-update algorithm

---

```
1: function DeriveNextKey(t_0, ..., t_{l−1})
2:   K ← ⊥
3:   for i ← 0 to l − 2 do
4:     if K = ⊥ then
5:       if t_i = A[i].ctr then
6:         continue
7:       else
8:         K ← A[i].key
9:         A[i].key ← f (K)
10:        A[i].ctr ← A[i].ctr + 1
11:        K ← g(K)
12:      end if
13:    else
14:      A[i].key ← f (K)
15:      A[i].ctr ← 0
16:      K ← g(K)
17:    end if
18:  end for
19:  if K = ⊥ then
20:    K ← A[l − 1].key
21:    A[l − 1].key ← f (K)
22:    A[l − 1].ctr ← A[l − 1].ctr + 1
23:  else
24:    A[l − 1].key ← K
25:    A[l − 1].ctr ← 0
26:  end if
27: end function
```

---

The scheme can be used in a similar way as explained for the example of the first option.

Assuming that the counter for time periods is on n bits, and that it is split into l equal-sized subintervals, we can see that a call to the DeriveKey in this example requires at most $O(l2^{n/l})$ PRNG invocations. The scheme of the example of the first option requires $O(1)$ space in the securely erasable memory whereas this example of the second option requires $O(l)$ space in the securely erasable memory.

Figure 2:
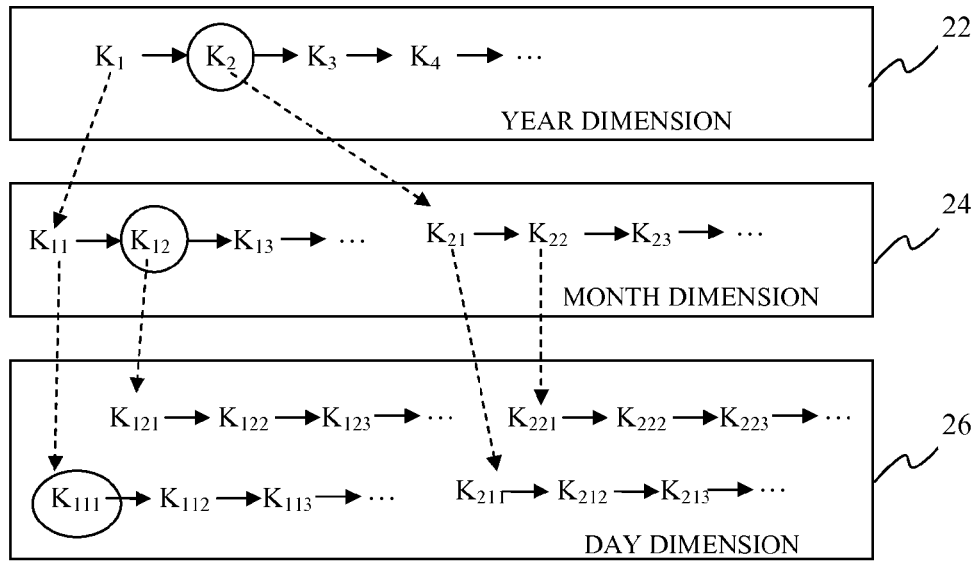
FIG. 2 shows an example of a structure for deriving keys.

In the previous example, the method uses a fixed parameter l to split the initial p-bit counter for time periods into p=l-bit sub-counters. This rigid partitioning of sub-counters and sub intervals can be easily relaxed, by allowing for different values of l for each sub-counter. Even more flexibly, each counter can have a predefined range, independent of the other counters. For example, FIG. 2 shows a practical deployment with separate counters for years, months and days. The circled keys represent the ones stored in securely deletable memory (i.e., the base keys). The arrow represents function $f$ while the dotted arrow represents function g. In the example, $K_1$ may be associated to the year 2012, $K_2$ to 2013 and so forth. Similarly, $K_{11}$ is associated to the same year as the parent node $K_1$ and at the month of January. $K_{12}$ is similarly associated to February 2012. Finally, $K_{111}$ is actually used to encrypt data that need keeping until Jan. 1, 2012.

More specifically, FIG. 2 shows an example of the structure of the key derivation (S20) for the second option of the storing method where: the incrementing one-way functions (noted $f$ and represented as continuous line arrows on FIG. 2) are the same and the transition one-way functions (noted g and represented as dotted line arrows on FIG. 2) are the same; the dimensions of the lexicographic order are of a variable cardinality, and the lexicographic order corresponds to a retention period.

An object is provided with an ordering vector corresponding to its retention period (e.g., the date where it has to be deleted, with a year, month and day). There are thus three dimensions (corresponding to year, month and day). $K_2$ is the base key associated to the year dimension. $K_2$ is represented as $f(K_1)$ on FIG. 2, but this is just for the purpose of notations, as $K_1$ is actually not stored by the system and not even derivable. Similarly, $K_{12}$ is the base key associated to the month dimension, and $K_{11}$ is actually not stored. Finally, $K_{111}$ is the base key associated to the day dimension. The keys obtained during the derivation (S20) for each dimension are respectively grouped in rectangles 22, 24 and 26 for the year, month and day dimension.

If a file is assigned to multiple—say n—retention periods, two scenarios can occur: either the file has to be deleted when the first of such periods expires, or when the last does. To support the former, the file's FEK needs to be encrypted once with a key that results from applying bit-wise exclusive or to the keys associated to each of the n retention periods. To support the latter, the file's FEK needs to be encrypted n times, once with each of the n keys associated to the last retention period.

If the retention period of a file needs to be dynamically changed after the file has been created, the file's FEK needs to be decrypted with the key associated to the initial retention period and re-encrypted with the key associated with the new retention period. Notice that only re-encryption of the FEK—i.e., a short bitstring—is required, and not of the entire file. Notice also that the above can only be performed if the initial retention period has not yet expired.

The examples constitute a viable solution to the problem of secure deletion for files that have a well-defined retention period: this problem is of extreme relevance for storage systems and services as it is a critical requirement in several customer scenarios. We have presented two different schemes, a basic one, and a second one that trades space for computational efficiency. The scheme also supports multiple retention periods and changes in retention periods.

Figure 3:
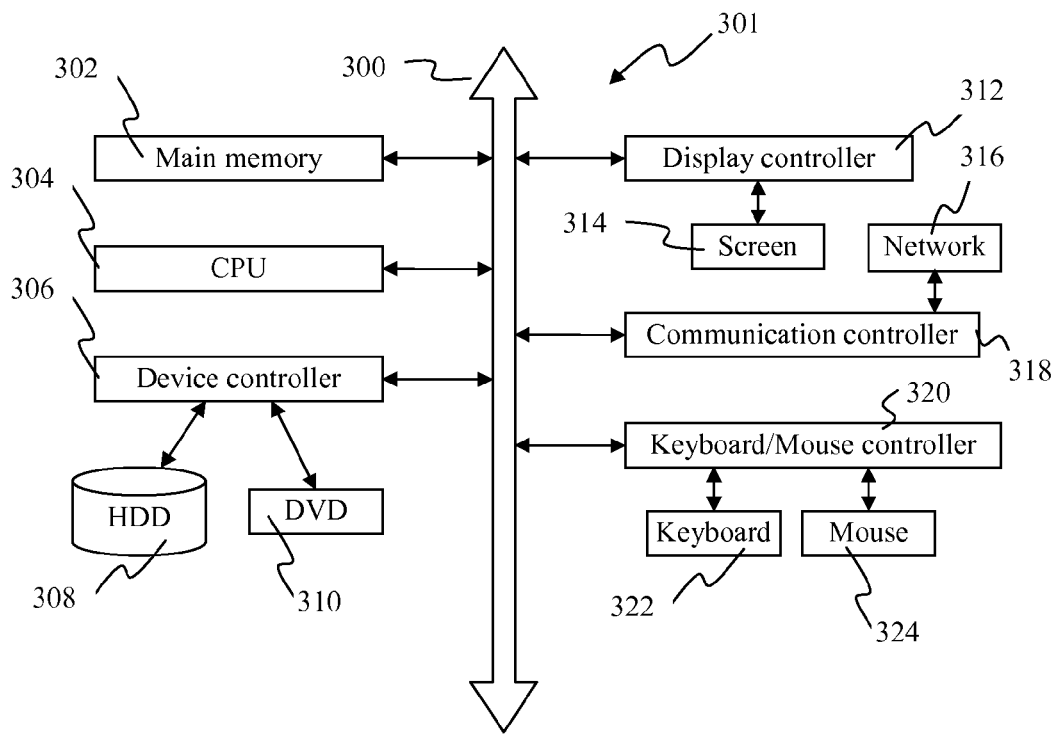
FIG. 3 represents an example of the computerized system.

FIG. 3 is a block diagram of hardware of a computerized system according to an embodiment of the invention. A computerized system 301 according to an embodiment of the invention includes a CPU 304 and a main memory 302, which are connected to a bus 300. The bus 300 is connected to a display controller 312 which is connected to a display 314 such as an LCD monitor. The display 314 is used to display information about a computer system. The bus 300 is also connected to a storage device such hard disk 308 or DVD 310 through a device controller 306 such as an IDE or SATA controller. The bus 300 is further connected to a keyboard 322 and a mouse 324 through a keyboard/mouse controller 310 or a USB controller (not shown). The bus is also connected to a communication controller 318 that conforms to, for example, an Ethernet (registered trademark) protocol. The communication controller 318 is used to physically connect the computer system 301 with a network 316. Main memory 302 may be erasable memory on which keys and one-way functions of the methods may be stored. Computerized system 301 may also comprise standard memory, including hard disk 308, and cache memory (not represented) for storing cached, journaled and/or snapshot versions of other levels of each graph (e.g., not stored on the erasable main memory). The different means specific to the system, such as the key management server, may consist in a series of computer program instructions recorded e.g., on main memory 302, or e.g., on HDD 308 and importable on main memory 302, and making CPU 304 perform functions of such means. Notably, the computerized system may be configured so as to make CPU 304 perform the method of FIG. 1.

The invention claimed is:

1. A computer-implemented method for storing an object, the method comprising:
providing an object, an ordering vector of the object, the ordering vector being associated to a lexicographic order having at least one dimension, and base keys associated to each dimension of the lexicographic order;
deriving a key by retrieving the base key associated to the first dimension of the lexicographic order for which the ordering vector has a value different from the smallest value, and applying a one-way function a number of times corresponding to the value of the ordering vector for the last dimension of the lexicographic order;
encrypting the object with the key; and
storing the object as encrypted;
wherein the dimension of the lexicographic order is equal to 1, the ordering vector having a single value and a single base key being provided, and deriving the key comprises retrieving the single base key and applying to the single base key the one-way function a number of times corresponding to the single value of the ordering vector.

2. The method of claim 1, wherein the dimensions of the lexicographic order are one of: a fixed cardinality and a variable cardinality.

3. The method of claim 1, wherein the lexicographic order corresponds to a retention period.

4. The method of claim 1, wherein the lexicographic order corresponds to an attribute of the object, the attribute having a value that belongs to a totally ordered set of values.

5. The method of claim 1, further comprising iterating at least one of the providing, deriving, encrypting and storing; thereby constructing a database of objects.

6. The method of claim 5, further comprising replacing the base key associated to the last dimension by the key derived for encrypting objects of next to lowest order thereby deleting objects of lowest order from an obtainable database.

7. A computer-implemented method for storing an object, the method comprising:
providing an object, an ordering vector of the object, the ordering vector being associated to a lexicographic order having at least one dimension, and base keys associated to each dimension of the lexicographic order;
deriving a key by retrieving the base key associated to the first dimension of the lexicographic order for which the ordering vector has a value different from the smallest value, and applying a one-way function a number of times corresponding to the value of the ordering vector for the last dimension of the lexicographic order;
encrypting the object with the key; and
storing the object as encrypted;
wherein the dimension of the lexicographic order is higher than 1, and deriving the key comprises, after retrieving the base key:
applying on the retrieved base key a respective incrementing one-way function a number of times corresponding to the value of the ordering vector for the first dimension of the lexicographic order for which the ordering vector has a value different from the smallest value;
repeating, from the first dimension of the lexicographic order for which the ordering vector has a value different from the smallest value until the last dimension of the lexicographic order, the following operations on the result of the applying on the retrieved base key a respective incrementing one-way function:
applying a respective transition one-way function; and
applying a respective incrementing one-way function a number of times corresponding to the value of the ordering vector for the next dimension.

8. The method of claim 7, wherein at least one of: the incrementing one-way functions, and the transition one-way functions are the same.

9. A computer readable storage device having computer readable instructions stored thereon that, when executed by a computer, implement a method of storing an object, the method comprising:
providing an object, an ordering vector of the object, the ordering vector being associated to a lexicographic order having at least one dimension, and base keys associated to each dimension of the lexicographic order;
deriving a key by retrieving the base key associated to the first dimension of the lexicographic order for which the ordering vector has a value different from the smallest value, and applying a one-way function a number of times corresponding to the value of the ordering vector for the last dimension of the lexicographic order;
encrypting the object with the key; and
storing the object as encrypted;
wherein the dimension of the lexicographic order is equal to 1, the ordering vector having a single value and a single base key being provided, and deriving the key comprises retrieving the single base key and applying to the single base key the one-way function a number of times corresponding to the single value of the ordering vector.

10. The computer readable storage device of claim 9, wherein the dimensions of the lexicographic order are one of: a fixed cardinality and a variable cardinality.

11. The computer readable storage device of claim 9, wherein the lexicographic order corresponds to a retention period.

12. The computer readable storage device of claim 9, wherein the lexicographic order corresponds to an attribute of the object, the attribute having a value that belongs to a totally ordered set of values.

13. A computer readable storage device having computer readable instructions stored thereon that, when executed by a computer, implement a method of storing an object, the method comprising:
- providing an object, an ordering vector of the object, the ordering vector being associated to a lexicographic order having at least one dimension, and base keys associated to each dimension of the lexicographic order;
- deriving a key by retrieving the base key associated to the first dimension of the lexicographic order for which the ordering vector has a value different from the smallest value, and applying a one-way function a number of times corresponding to the value of the ordering vector for the last dimension of the lexicographic order;
- encrypting the object with the key; and
- storing the object as encrypted;
- wherein the dimension of the lexicographic order is higher than 1, and deriving the key comprises, after retrieving the base key:
- applying on the retrieved base key a respective incrementing one-way function a number of times corresponding to the value of the ordering vector for the first dimension of the lexicographic order for which the ordering vector has a value different from the smallest value;
- repeating, from the first dimension of the lexicographic order for which the ordering vector has a value different from the smallest value until the last dimension of the lexicographic order, the following operations on the result of the applying on the retrieved base key a respective incrementing one-way function:
- applying a respective transition one-way function; and
- applying a respective incrementing one-way function a number of times corresponding to the value of the ordering vector for the next dimension.

14. The computer readable storage device of claim 13, wherein at least one of: the incrementing one-way functions, and the transition one-way functions are the same.

15. A system, comprising:
- a key management server including a processor and a memory, the key management server configured to: provide an object, an ordering vector of the object, the ordering vector being associated to a lexicographic order having at least one dimension, and base keys associated to each dimension of the lexicographic order;
- derive a key by retrieving the base key associated to the first dimension of the lexicographic order for which the ordering vector has a value different from the smallest value, and applying a one-way function a number of times corresponding to the value of the ordering vector for the last dimension of the lexicographic order;
- encrypt the object with the key; and
- store the object as encrypted;
- wherein the dimension of the lexicographic order is equal to 1, the ordering vector having a single value and a single base key being provided, and deriving the key comprises retrieving the single base key and applying to the single base key the one-way function a number of times corresponding to the single value of the ordering vector.

* * * * *